(12) United States Patent
Cui et al.

(10) Patent No.: US 11,762,675 B2
(45) Date of Patent: Sep. 19, 2023

(54) METHOD AND APPARATUS FOR LOADING PICTURE

(71) Applicant: BEIJING XIAOMI MOBILE SOFTWARE CO., LTD., Beijing (CN)

(72) Inventors: Baoqiu Cui, Beijing (CN); Hua Wu, Beijing (CN); Kang Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/382,157

(22) Filed: Jul. 21, 2021

(65) Prior Publication Data

US 2022/0222092 A1 Jul. 14, 2022

(30) Foreign Application Priority Data

Jan. 14, 2021 (CN) .......................... 202110046009.6

(51) Int. Cl.
*G06F 9/451* (2018.01)
*G06F 3/0485* (2022.01)
(Continued)

(52) U.S. Cl.
CPC ............ *G06F 9/451* (2018.02); *G06F 3/0483* (2013.01); *G06F 3/0485* (2013.01); *G06F 9/445* (2013.01);
(Continued)

(58) Field of Classification Search
CPC ........ G06F 9/445; G06F 9/451; G06F 9/4881; G06F 3/0483; G06F 3/0485;
(Continued)

(56) References Cited

U.S. PATENT DOCUMENTS

2008/0079972 A1* 4/2008 Goodwin ............... G09G 5/346
358/1.12
2009/0288035 A1* 11/2009 Tunning .............. G06F 16/9574
715/784
(Continued)

FOREIGN PATENT DOCUMENTS

CN 104951317 A 9/2015
WO WO 2018201746 A1 11/2018

OTHER PUBLICATIONS

Standards Information Network IEEE Press. (2000). Mount. In IEEE 100 The Authoritative Dictionary of IEEE Standards Terms. (7th Edition, p. 719-720). The Institute of Electrical and Electronics Engineering, Inc. (Year: 2000).*
(Continued)

*Primary Examiner* — David S Posigian
(74) *Attorney, Agent, or Firm* — COZEN O'CONNOR

(57) ABSTRACT

The disclosure relates to a method and an apparatus for loading a picture. A target page element is obtained. A motion state of the target page element is obtained. A to-be-loaded picture carried by the target page element is obtained. The to-be-loaded picture is added to a to-be-loaded queue based on the motion state being a scrolling state. The to-be-loaded queue is configured to monitor the to-be-loaded picture based on a change of the motion state. The to-be-loaded picture is added to a loading state based on the motion state changing to a non-scrolling state.

17 Claims, 4 Drawing Sheets

(51) Int. Cl.
*G06F 16/957* (2019.01)
*G06F 3/0483* (2013.01)
*G06F 9/445* (2018.01)
*G06F 9/48* (2006.01)

(52) U.S. Cl.
CPC ........ *G06F 9/4881* (2013.01); *G06F 16/9574* (2019.01)

(58) Field of Classification Search
CPC .. G06F 3/04855; G06F 16/172; G06F 16/957; G06F 16/9574; G06F 16/9577; G06F 2201/885; H04L 67/2842–2857; H04L 67/568–5683
See application file for complete search history.

(56) References Cited

U.S. PATENT DOCUMENTS

| | | | | |
|---|---|---|---|---|
| 2012/0084343 | A1* | 4/2012 | Mir | G06F 40/134 709/203 |
| 2012/0127209 | A1* | 5/2012 | Yajima | G06F 3/04883 345/156 |
| 2012/0159393 | A1* | 6/2012 | Sethi | G06F 16/248 715/830 |
| 2014/0108969 | A1* | 4/2014 | Joel | G06F 16/9577 715/760 |
| 2014/0379841 | A1* | 12/2014 | Zong | H04L 67/2842 709/213 |
| 2015/0261770 | A1* | 9/2015 | Chen | H04L 67/18 715/234 |
| 2016/0217143 | A1 | 7/2016 | Cao | |
| 2017/0123617 | A1* | 5/2017 | Zhao | H04L 67/10 |
| 2019/0220182 | A1* | 7/2019 | Wu | G06F 40/106 |
| 2020/0192538 | A1* | 6/2020 | Karpe | H04L 67/568 |

OTHER PUBLICATIONS

Microsoft Press. (2002). Mount. In Microsoft Computer Dictionary. (5th Edition, p. 348). Microsoft Press A Division of Microsoft Corporation (Year: 2002).*
Bemenderfer, Joshua. 'Understanding Vue.js Lifecycle Hooks'. In DigitalOcean [online]. Feb. 11, 2017. [Retrieved on Sep. 29, 2022]. Retrieved from the Internet: <https://web.archive.org/web/20200813123256/https://www.digitalocean.com/community/tutorials/vuejs-component-lifecycle>. (Year: 2017).*
Chinese Patent Application No. 202110046009.6, Office Action dated Feb. 24, 2021, 5 pages.
Chinese Patent Application No. 202110046009.6, English translation of Office Action dated Feb. 24, 2021, 9 pages.
European Patent Application No. 21185594.5 extended Search and Opinion dated Jan. 5, 2022, 8 pages.

* cited by examiner

METHOD AND APPARATUS FOR LOADING PICTURE

CROSS REFERENCE TO RELATED APPLICATIONS

This application claims priority and benefits to Chinese Application No. 202110046009.6, filed on Jan. 14, 2021, the entire content of which is incorporated herein by reference.

TECHNICAL FIELD

The disclosure relates to a field of page technologies, and particularly to a method and an apparatus for loading a picture, an electronic device and a storage medium.

BACKGROUND

For rendering a page, pictures are continuously loaded and cached based on page content. As the page content becomes richer and richer, more and more pictures are loaded to render the page. As a result, resource consumption of a smart device such as a mobile terminal has significantly increased.

SUMMARY

A method for loading a picture is provided. The method includes: obtaining a target page element; obtaining a motion state of the target page element; obtaining a to-be-loaded picture carried by the target page element; adding the to-be-loaded picture to a to-be-loaded queue based on the motion state being a scrolling state, the to-be-loaded queue being configured to monitor the to-be-loaded picture based on a change of the monition state, and adding the to-be-loaded picture to a loading queue to be downloaded based on the motion state changing to a non-scrolling state.

A non-transitory computer readable storage medium is provided. When instructions stored in the storage medium are executed by a processor of an electronic device, the processor is caused to execute a method for loading a picture as described above.

An electronic device is further provided. The electronic device includes: a processor; and a memory configured to store instructions executable by the processor. The processor is configured to execute the instructions to execute the method for loading a picture as described above.

It should be noted that, the details above and in the following are exemplary and illustrative, and do not constitute the limitation on the disclosure.

BRIEF DESCRIPTION OF THE DRAWINGS

The drawings herein are incorporated into the specification and constitute a part of the specification, show embodiments in conformity with the disclosure, and explain the principle of the disclosure together with the specification, which do not constitute an incorrect limitation of the disclosure.

DETAILED DESCRIPTION

In order to make those skilled in the art well understand technical solutions of the disclosure, the technical solutions of the disclosure will be described clearly and completely in combination with the accompanying drawings of the disclosure.

It is to be noted that, terms "first", "second" used in the description and the appended claims are used to distinguish similar objects, rather than describe a specific order or a timing order. It is to be understood that the data used herein may be exchanged appropriately such that embodiments of the disclosure described herein may be implemented in an order other than those illustrated or described herein. The implementations described in following exemplary embodiments do not represent all implementations consistent with the disclosure. Rather, they are merely examples of apparatuses and methods consistent with some aspects of the disclosure, as detailed in the appended claims.

While a page is being loaded, a user may scroll the page continuously. At present, for the above case, all pictures are loaded, causing a heavy burden on the smart device and reduction of operation efficiency of the smart device. For example, due to a scrolling operation on pictures of the page, elements corresponding to the pictures may be frequently loaded or removed on or from a render tree, and thus the pictures corresponding to the elements may be frequently loaded and removed on and from the cache. Not only cache resources are wasted, but also excessive CPU resource of the device are occupied because of continuous downloading, encoding and decoding of the pictures. As a result, when the scrolling operation is performed on a displayed page, unsmooth display may be caused, and power consumption may be increased.

Therefore, embodiments of the disclosure provide a method for loading a picture, an electronic device, and a storage medium. It may be determined whether to load the picture based on the motion state of the picture. When the picture is in the scrolling state, the picture is not directly downloaded but is added to the to-be-loaded queue, and the to-be-loaded picture in the to-be-loaded queue is monitored. When the scrolling state changes, the picture is moved to the loading queue and to be downloaded. Unnecessary downloading, traffic consumption, and occupation of memory and CPU resources can be reduced.

In embodiments of the disclosure, a respective context may be set for each picture. The context is used to represent states of the picture, such as a scrolling state or a position state indicating a positional relationship between the picture and a view, such as the picture being within or outside the view. The picture may be uploaded or downloaded on or from a render tree based on the context. For example, when a picture is currently in the scrolling state, the picture is not loaded until stopping scrolling the picture, to avoid unnecessary loading of the picture.

Figure 1:
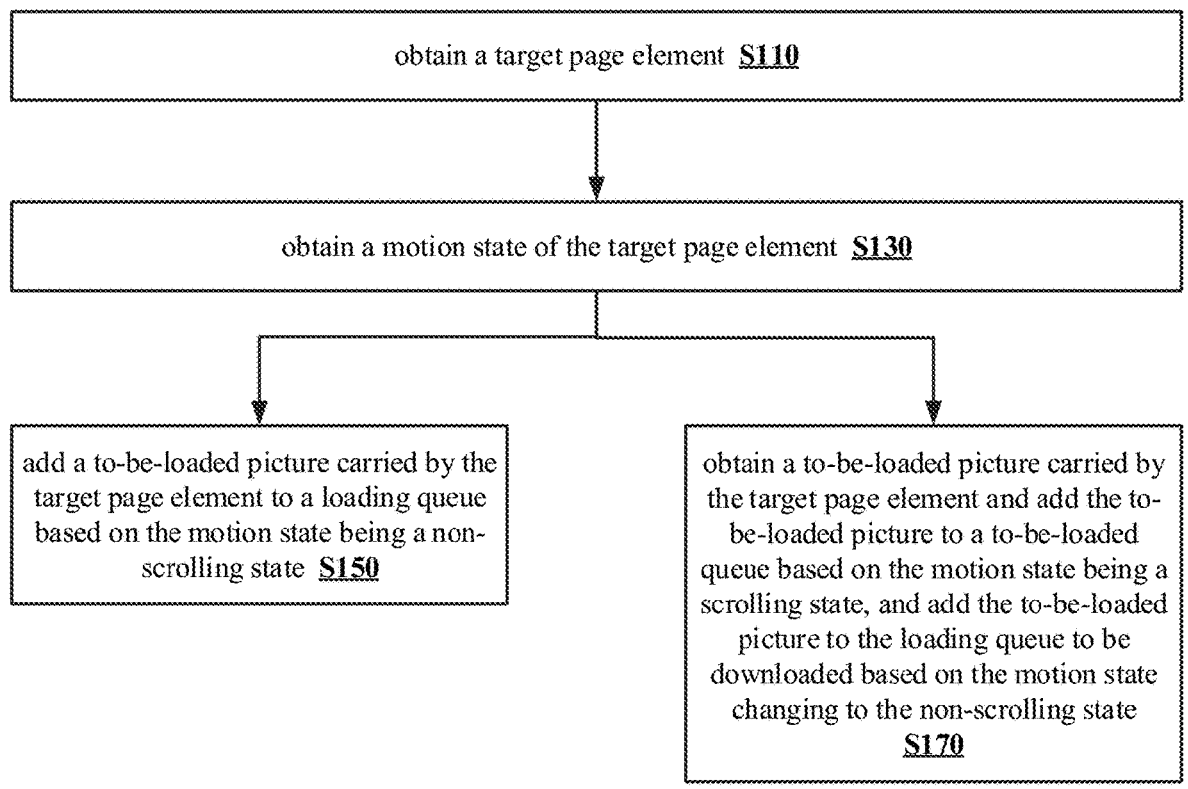
FIG. 1 is a flowchart illustrating a method for loading a picture according to embodiments of the disclosure.

FIG. 1 is a flowchart illustrating a method for loading a picture according to embodiments of the disclosure. The method may include the following.

At block S110, a target page element is obtained.

In some examples, a page may correspond to a layout tree. For designing a layout of a page and rendering the page, a corresponding render tree is generated based on the layout tree and a corresponding Cascading Style Sheet (CSS), and the corresponding page is generated based on the render tree. The layout tree includes multiple nodes. Each node corresponds to a respective page element. Each node has its own configuration information. The configuration information is used to define parameters of the node, such as a position and a size or dimension of the node (i.e., a corresponding page element).

Figure 2:
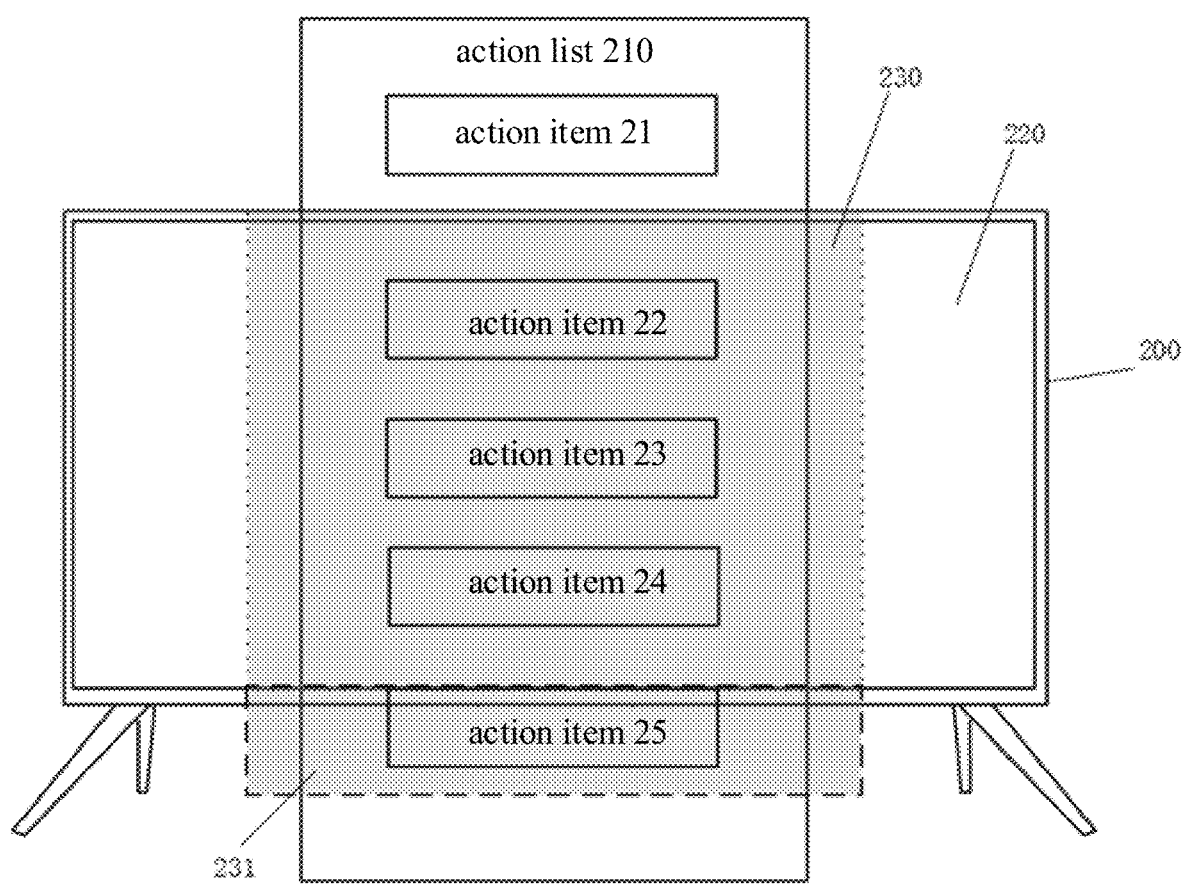
FIG. 2 is a schematic diagram illustrating a method for obtaining a target page element according to embodiments of the disclosure.

The target page element refers to a page element entering into a current list viewport. For example, the disclosure will be described by taking a smart television as an example. FIG. 2 is a schematic diagram illustrating a method for obtaining a target page element according to embodiments of the disclosure, where the smart television is taken as an example for description. The smart television 200 has an action list 210 and a display area 220. The action list 210 includes multiple page elements, and each page element forms an action item. The action list 210 has a current list viewport 230, and the list viewport 230 has a buffer area 231. The action list 210 includes action items 21 to 25. As can be seen in the figure, the action list 210 is long and includes the multiple action items. Since the action list 210 is long, the action list 210 cannot be completely displayed on the smart television 200. Therefore, the list viewport 230 is adopted to display a visible part of the action list 210. The list viewport 230 refers to a part displayed through the smart television 230. In an example, when a certain action item (for example, the action item 25) enters into the buffer area 231, which means that this action item is prepared to enter into the list viewport 230 and to be loaded, the layout of action items in the buffer area 231 are to be designed and rendered. Therefore, in an example, a page element that enters in the buffer area is taken as the target page element. In other examples, a page element that enters in the current list viewport may be taken as the target page element.

There may be one or more target page elements, and the number of the target page elements is determined by the number of the page elements entering in the buffer area.

At block S130, a motion state of the target page element is obtained.

The target page element may carry a picture. In some examples, the target page element carrying a picture means that the target page element includes an identifier or a thumbnail of the picture, and the picture corresponds to the identifier or the thumbnail. As an example, when the target page element is displayed on an interface, the picture corresponding to the target page element is loaded based on the identifier or the thumbnail and the loaded picture is displayed on the interface. As another example, when the target page element slides over the interface, the picture corresponding to the target page element is not loaded or displayed on the interface and the identifier or the thumbnail slides along with the target page element over the interface.

For rendering the target page element, the picture needs to be downloaded and loaded. In the disclosure, the picture carried by the target page element is not directly downloaded, but a motion state label of a to-be-loaded picture is set based on the motion state of the target page element. A respective label may be set for the to-be-loaded picture corresponding to each target page element, such as a motion state label, a position state label or the like. The label of the to-be-loaded picture is determined by the motion state of the corresponding target page element. For example, when the motion state of the target page element is a scrolling state, the label set for the to-be-loaded picture carried by the target page element is a scrolling state label. When the motion state of the target page element is a non-scrolling state, the label set for the to-be-loaded picture carried by the target page element is a non-scrolling state label.

At block S150, when the motion state of the target page element is a non-scrolling state, the to-be-loaded picture carried by the target page element is added to a loading queue. When the motion state of the page element carrying the to-be-loaded picture is the non-scrolling state, which indicates that the to-be-loaded picture is in the non-scrolling state and the user is normally browsing the to-be-loaded picture, the to-be-loaded picture is added to the loading queue and to be normally downloaded.

Normally browsing the to-be-loaded picture means that the to-be-loaded picture is displayed on a current interface.

At block S170, when the motion state of the target page element is the scrolling state, the to-be-loaded picture carried by the target page element is obtained and the to-be-loaded picture is added to a to-be-loaded queue. The to-be-loaded queue is configured to monitor the to-be-loaded picture based on a change in the motion state of the target page element. When the motion state of the target page element changes to the non-scrolling state, the to-be-loaded picture is added to the loading queue and to be downloaded.

When it is determined that the target page element is in the scrolling state based on the motion state of the to-be-loaded picture carried by the target page element, it can be determined that the to-be-loaded picture is in the scrolling state and the user is scrolling through the page. In this case, the to-be-loaded picture is added in the to-be-loaded queue for further observation. In an example, the target page element can be rendered, but pictures carried by the target page element are not loaded. From the perspective of the user, an outline of the target page element is obtained, but the pictures carried by the target page element cannot be seen since the pictures are in the scrolling state.

In some examples, a page manager maintains the to-be-loaded queue and the loading queue. The loading queue includes multiple loading tasks. For the loading tasks in the loading queue, the page manager downloads the to-be-loaded pictures in the loading queue one by one. However, the to-be-loaded pictures in the to-be-loaded queue are monitored periodically rather than being directly downloaded.

It is to be noted that, the to-be-loaded picture in the scrolling state is also loaded by monitoring the state of the to-be-loaded picture. If the label corresponding to the to-be-loaded picture changes, the to-be-loaded picture is moved from the to-be-loaded queue to the loading queue and is to be loaded, or the to-be-loaded picture is removed from the to-be-loaded queue.

For example, the label of the to-be-loaded picture in the to-be-loaded queue is monitored periodically. When the motion state label is switched from the scrolling state label to the non-scrolling state label, which indicates that the user stops scrolling the page and a position corresponding to the to-be-loaded picture of the page currently stays on the interface, the to-be-loaded picture is moved from the to-be-loaded queue to the loading queue and to be loaded. When the motion state label corresponding to the to-be-loaded picture is the scrolling state label, the to-be-loaded picture is still in the to-be-loaded queue.

When the page element corresponding to the to-be-loaded picture in the to-be-loaded queue is unloaded, which indicates that the page element has been crossed by the user, the to-be-loaded picture corresponding to the page element is deleted from the to-be-loaded queue.

Figure 3:
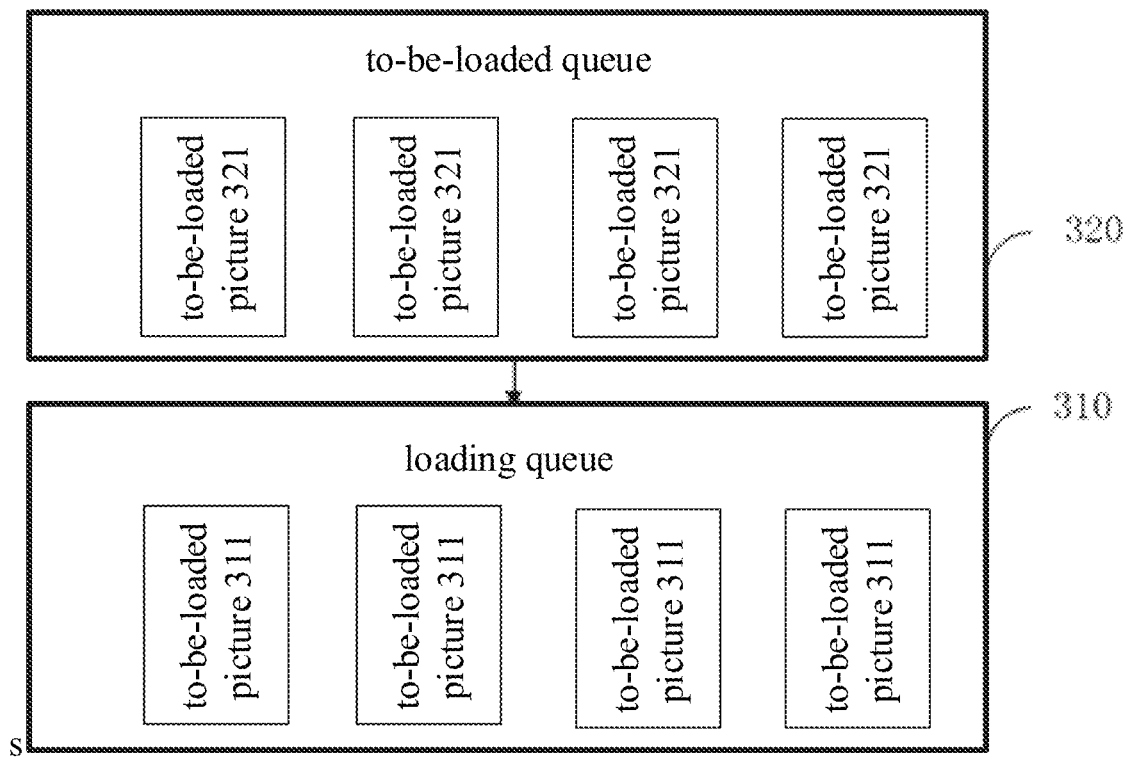
FIG. 3 is a schematic diagram illustrating a to-be-loaded queue and a loading queue according to embodiments of the disclosure.

FIG. 3 is a schematic diagram illustrating a to-be-loaded queue and a loading queue according to embodiments of the disclosure. The loading queue 310 includes multiple to-be-loaded pictures 311, and the to-be-loaded queue 320 includes multiple to-be-loaded pictures 321. States of the page elements corresponding to the to-be-loaded pictures in the to-be-loaded queue are monitored periodically. That is, the labels of the to-be-loaded pictures are queried. When the label corresponding to a to-be-loaded pictures changes, for example, the label is switched from the scrolling state label to the non-scrolling state label, the to-be-loaded picture is moved from the to-be-loaded queue to the loading queue.

A mounting state of the target page element may be further obtained. When the mounting state of the target page element is a mounted state and the motion state is the non-scrolling state, the to-be-loaded picture is added to the loading queue. That is, when the target page element is in the mounted state and the motion state is the non-scrolling state, it can be determined that the user is browsing the page normally, and thus the to-be-loaded picture is added to the loading queue and to be normally downloaded. When the mounting state of the target page element is the mounted state and the motion state is the scrolling state, the to-be-loaded picture is added to the to-be-loaded queue. That is, when the target page element is in the mounted state and the motion state is the scrolling state, it can be determined that the user is scrolling the page, and thus the to-be-loaded picture is not directly downloaded, but added to the to-be-loaded queue and monitored. When the scrolling state of the to-be-loaded picture changes, the to-be-loaded picture is moved to the loading queue and to be downloaded. When the mounting state of the target page element is a non-mounted state, the target page element is not processed. That is, the to-be-loaded picture is not added to the loading queue or a to-be-loaded queue.

A position state of the target page element may be further obtained and a position state label may be generated based on the position state. When it is determined that the target page element is within a display space of an electronic device based on the position state of the target page element, for example, in a view of a mobile phone or a digital television, it indicates that the user is going to browse the target page element. In this case, the motion state of the page element is further detected. When the motion state is the non-scrolling state, it indicates that the user is normally browsing the page, and thus the to-be-loaded picture is added to the loading queue and to be downloaded. When it is determined that the page element is within the display space of the electronic device based on the position state of the target page element and the motion state is the scrolling state, the to-be-loaded picture is added to the to-be-loaded queue, and the to-be-loaded queue is monitored.

When it is determined that the page element is outside the display space of the electronic device based on the position state of the target page element, it indicates that the target page element has not been browsed or that the target page element has been crossed by the current list viewport, and thus the to-be-loaded picture is not added to the to-be-loaded queue or the loading queue. The to-be-loaded picture in the to-be-loaded queue refers to a picture (which is in the scrolling state) carried by the target page element within the display view of the electronic device.

For rendering a page, the motion state of the page element corresponding to the to-be-loaded picture in the to-be-loaded queue keeps to be monitored. When the motion state of the page element is switched from the scrolling state to the non-scrolling state, it indicates that the user stops scrolling the page and is normally browsing the page, and thus the to-be-loaded picture is moved from the to-be-loaded queue to the loading queue, to be normally downloaded and loaded in the page element.

When the mounting state of the target page element is the non-mounted state, the to-be-loaded picture is removed from the to-be-loaded queue.

With the disclosure, it is determined whether to load the picture based on the motion state label of the picture. When the picture is in the scrolling state, the picture is not directly downloaded but is added to the to-be-loaded queue, and the to-be-loaded picture in the to-be-loaded queue is monitored. When the scrolling state changes, the picture is moved to the loading queue and to be downloaded. Unnecessary downloading, traffic consumption, and occupation of memory and CPU resources can be reduced.

Figure 4:
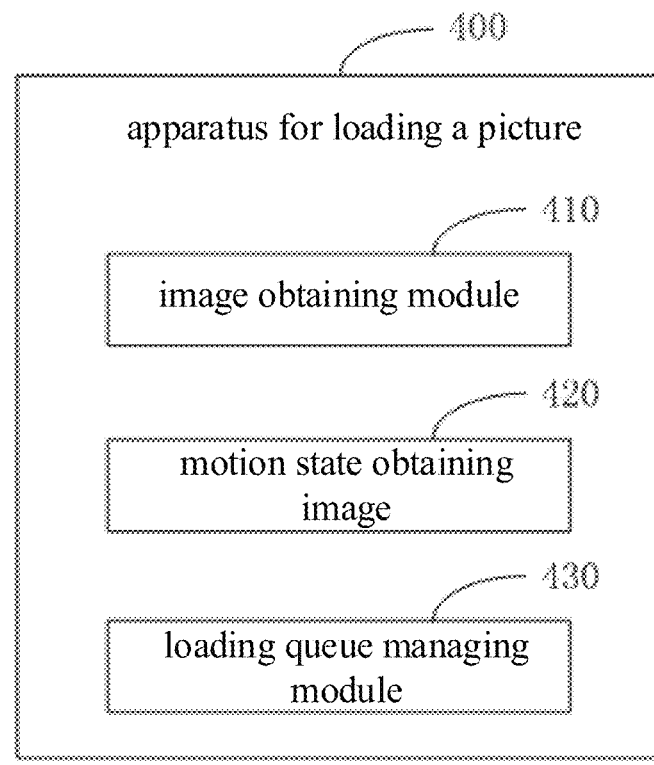
FIG. 4 is a block diagram illustrating an apparatus for loading a picture according to embodiments of the disclosure.

FIG. 4 is a block diagram illustrating an apparatus for loading a picture according to embodiments of the disclosure. The apparatus 400 includes an obtaining module 410, a motion state obtaining module 420 and a loading queue managing module 430. The obtaining module 410 is configured to obtain a target page element. The motion state obtaining module 420 is configured to obtain a motion state of the target page element. The loading queue managing module 430 is configured to obtain a to-be-loaded picture carried by the target page element and add the to-be-loaded picture to a to-be-loaded queue based on the motion state changing to a scrolling state, and add the to-be-loaded picture to the loading queue to be downloaded based on the motion state being a non-scrolling state. The to-be-loaded queue is configured to monitor the to-be-loaded picture based on a change in the motion state of the target page element.

In some examples, the loading queue managing module 430 is further configured to add the to-be-loaded picture to the loading queue when the motion state of the target page element is the non-scrolling state.

In some examples, the loading queue managing module 430 is further configured to obtain a mounting state of the target page element, add the to-be-loaded picture to the loading queue when the mounting state of the target page element is a mounted state and the motion state is the non-scrolling state, and add the to-be-loaded picture to the to-be-loaded queue when the mounting state is the mounted state and the motion state is the scrolling state. When the mounting state is a non-mounted state, the to-be-loaded picture is not added to the to-be-loaded queue or the loading queue.

In some examples, the loading queue managing module 430 is further configured to obtain a position state of the target page element, add the to-be-loaded picture to the loading queue when determining that the target page element is within a display space of an electronic device based on the position state of the target page element and the motion state is the non-scrolling state, and add the to-be-loaded picture to the to-be-loaded queue when determining that the page element is within the display space of the electronic device based on the position state of the target page element and the motion state is the scrolling state.

In some examples, the loading queue managing module 430 is further configured to not adding the to-be-loaded picture to the to-be-loaded queue or the loading queue when determining that the page element is outside the display space of the electronic device based on the position state of the target page element.

In some examples, the loading queue managing module 430 is further configured to detect the motion state of the page element corresponding to the to-be-loaded picture in the to-be-loaded queue for rendering a page, and moving the to-be-loaded picture from the to-be-loaded queue to the loading queue when the motion state of the target page element is switched from the scrolling state to the non-scrolling state.

In some examples, the loading queue managing module 430 is further configured to remove the to-be-loaded picture from the to-be-loaded queue when the mounting state of the target page element is a non-mounted state.

According to a third aspect of embodiments of the disclosure, a non-transitory computer readable storage medium is further provided. When instructions in the storage medium are executed by a processor of an electronic device, the processor is caused to execute the above-mentioned method for loading a picture.

According to a fourth aspect of embodiments of the disclosure, an electronic device is further provided. The electronic device includes a processor and a memory configured to store instructions executable by the processor. The processor is configured to execute the instructions to execute the above-mentioned method for loading a picture.

In order to implement above embodiments, the disclosure further provides a storage medium.

When instructions in the storage mediums are executed by a processor of an electronic device, the electronic device is caused to execute the above-mentioned method.

In order to implement above embodiments, the disclosure further provides a computer program product.

When the computer program product is executed by a processor of an electronic device, the electronic device is caused to execute the above-mentioned method.

Figure 5:
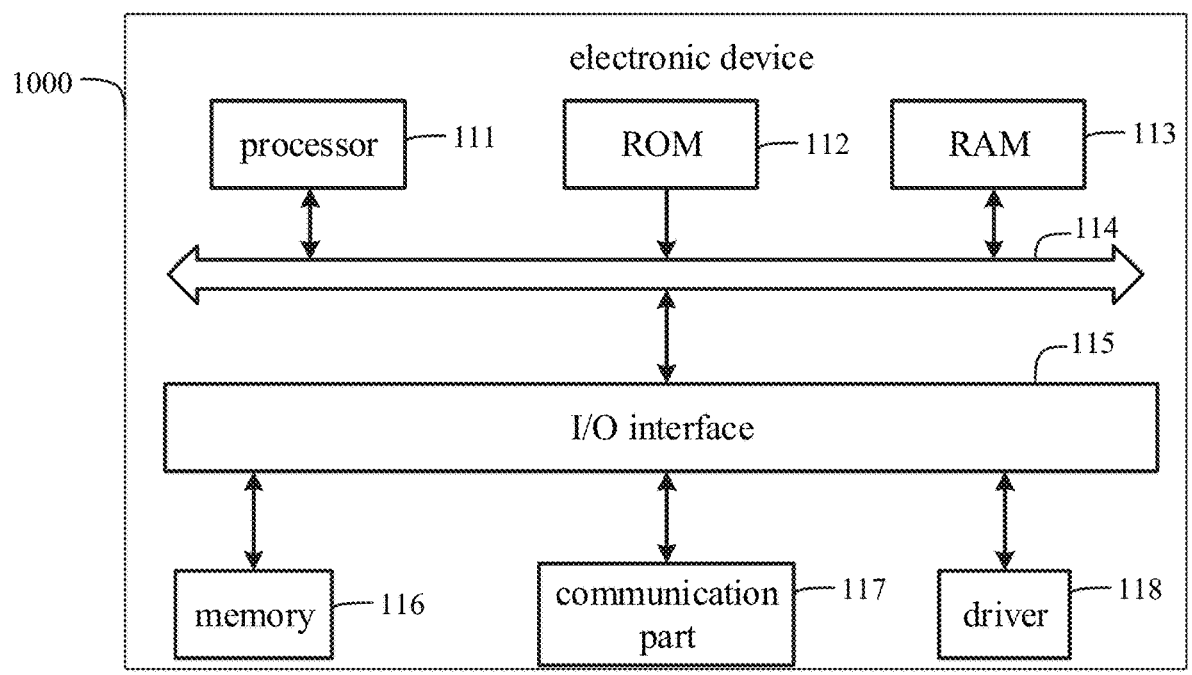
FIG. 5 is a block diagram illustrating an electronic device according to embodiments of the disclosure.

FIG. 5 is a block diagram illustrating an electronic device according to embodiments of the disclosure. The electronic device illustrated in FIG. 5 is only an example and should not be considered as a limitation on a function or application range of the disclosure.

As illustrated in FIG. 5, the electronic device 1000 includes a processor 111. The processor 111 is configured to execute various appropriate actions and processes based on computer programs stored in a read-only memory (ROM) 112 or loaded from a memory 116 to a random access memory (RAM) 113. In the RAM 113, various programs and data required for operations of the electronic device 1000 may be stored. The processor 111, the ROM 112 and the RAM 113 may be connected via a bus 114. An input/output (I/O) interface 115 is also connected to the bus 114.

The following components can be connected to the I/O interface 115: the memory 116 including hard dishes and a communication part 117 of a network interface card such as a Local Area Network (LAN) card and a modem. The communication part 117 performs the communication processing through a network such as Internet. In addition, the driver 118 is also connected to the I/O interface 115 as required.

In particular, with embodiments of the disclosure, the process described above with reference to the flowchart may be implemented as a computer software program. For example, embodiments of the disclosure include a computer program carried on a computer-readable medium. The computer program contains program codes for performing the above-mentioned in the flowchart. In such embodiments, the computer program may be downloaded and installed from the network through the communication part 117. When the computer program is executed by the processor 111, the above functions defined in the method of the disclosure are performed.

In some embodiments, a storage medium including instructions is further provided, such as the memory including instructions. The instructions may be executed by the processor 111 of the electronic device 1000 to implement the above-mentioned method. In some examples, the storage medium may be a non-transitory computer-readable storage medium. For example, the non-transitory computer-readable storage medium may be a ROM, a random access memory (RAM), a CD-ROM, a magnetic tape, a floppy disk, an optical data storage device, etc.

In the disclosure, the computer-readable storage medium may be any tangible medium that may contain or store a program for use by or in connection with an instruction execution system, apparatus, or device. In the disclosure, a computer-readable signal medium may include a data signal transmitted in a baseband or as a part of a carrier wave, which carries a computer readable program code. Such a data signal transmitted may take a variety of forms, including but not limited to an electromagnetic signal, an optical signal, or any suitable combination of the foregoing. A computer readable signal medium may be further any computer readable medium in addition to a computer readable storage medium, and the computer readable medium may transmit, spread or transport a program for use by or in connection with an instruction execution system, apparatus, or device. A program code contained on a computer readable medium may be transmitted by any suitable medium, including but not limited to a wireless, an electric cable, an optical fiber cable, an RF, etc., or any suitable combination of the foregoing.

With the disclosure, it is determined whether to load the picture based on the motion state label of the picture. When the picture is in the scrolling state, the picture is not directly downloaded but is added to the to-be-loaded queue, and the to-be-loaded picture in the to-be-loaded queue is monitored. When the scrolling state changes, the picture is moved to the loading queue and to be downloaded. Unnecessary downloading, traffic consumption, and occupation of memory and CPU resources can be reduced.

After considering the specification and practicing the disclosure herein, those skilled in the art will easily think of other implementations. The application is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the claimed invention is only limited by the appended claims.

What is claimed is:

1. A method for loading a picture, comprising:
obtaining at least one target page element;
obtaining a motion state of the at least one target page element as a scrolling state;
obtaining at least one to-be-loaded picture carried by the at least one target page element;
in response to obtaining the motion state as the scrolling state, adding the at least one to-be-loaded picture to a to-be-loaded queue and not downloading the at least one to-be-loaded picture in the to-be-loaded queue;

setting a motion state label of the at least one to-be-loaded picture as a scrolling state in response to obtaining the motion state of the at least one target page element as the scrolling state;

monitoring the at least one to-be-loaded picture in the to-be-loaded queue by monitoring the motion state of the at least one target page element carrying the at least one to-be-loaded picture;

obtaining that the motion state label of the at least one target page element carrying the at least one to-be-loaded picture in the to-be-loaded queue changes from the scrolling state to a non-scrolling state;

setting the motion state label of the at least one to-be-loaded picture as a non-scrolling state in response to obtaining that the motion state of the at least one target page element changes from the scrolling state to the non-scrolling stat;

moving the at least one to-be-loaded picture from the to-be-loaded queue to a loading queue to be downloaded in response to setting the motion state label of the at least one to-be-loaded picture as the non-scrolling state;

downloading, one by one, the at least one to-be-loaded picture in the loading queue; and displaying at least one of the at least one downloaded to-be-loaded picture in a display space of an electronic device.

2. The method of claim 1, further comprising:

obtaining a mounting state of the at least one target page element, wherein the mounting state is configured to indicate whether the at least one target page element is mounted or not;

moving the at least one to-be-loaded picture from the to-be-loaded queue to the loading queue based on the mounting state indicating that the at least one target page element is mounted and the motion state label being the non-scrolling state, and adding the at least one to-be-loaded picture to the to-be-loaded queue based on the mounting state indicating that the at least one target page element is mounted and the motion state label being the scrolling state.

3. The method of claim 2, further comprising:

not adding the at least one to-be-loaded picture to the to-be-loaded queue or moving the at least one to-be-loaded picture from the to-be-loaded queue to the loading queue based on the mounting state indicating that the at least one target page element is not mounted.

4. The method of claim 1, further comprising:

obtaining a position state of the at least one target page element, moving the at least one to-be-loaded picture from the to-be-loaded queue to the loading queue in response to determining that the at least one target page element is within the display space of the electronic device based on the position state and the motion state label being the non-scrolling state; and adding the at least one to-be-loaded picture to the to-be-loaded queue in response to determining that the at least one target page element is within the display space of the electronic device based on the position state and the motion state label being the scrolling state.

5. The method of claim 4, further comprising:

not adding the at least one to-be-loaded picture to the to-be-loaded queue or moving the at least one to-be-loaded picture from the to-be-loaded queue to the loading queue in response to determining that at least one the target page element is outside the display space of the electronic device based on the position state.

6. The method of claim 1, further comprising:

removing the at least one to-be-loaded picture from the to-be-loaded queue in response to the at least one target page element being not mounted.

7. A non-transitory computer-readable storage medium, having instructions stored thereon, wherein when the instructions are executed by a processor, the processor is caused to execute a method for loading a picture, the method comprising:

obtaining at least one target page element;

obtaining a motion state of the at least one target page element as a scrolling state;

obtaining at least one to-be-loaded picture carried by the at least one target page element;

in response to obtaining the motion state as the scrolling state, adding the at least one to-be-loaded picture to a to-be-loaded queue and not downloading the at least one to-be-loaded picture in the to-be-loaded queue;

setting a motion state label of the at least one to-be-loaded picture as a scrolling state in response to obtaining the motion state of the at least one target page element as the scrolling state;

monitoring the at least one to-be-loaded picture in the to-be-loaded queue by monitoring the motion state of the at least one target page element carrying the at least one to-be-loaded picture;

obtaining that the motion state label of the at least one target page element carrying the at least one to-be-loaded picture in the to-be-loaded queue changes from the scrolling state to a non-scrolling state;

setting the motion state label of the at least one to-be-loaded picture as a non-scrolling state in response to obtaining that the motion state of the at least one target page element changes from the scrolling state to the non-scrolling stat;

moving the at least one to-be-loaded picture from the to-be-loaded queue to a loading queue to be downloaded in response to setting the motion state label of the at least one to-be-loaded picture as the non-scrolling state;

downloading, one by one, the at least one to-be-loaded picture in the loading queue; and displaying at least one of the at least one downloaded to-be-loaded picture in a display space of an electronic device.

8. The non-transitory computer-readable storage medium of claim 7, wherein the method further comprises:

obtaining a mounting state of the at least one target page element, wherein the mounting state is configured to indicate whether the at least one target page element is mounted or not;

moving the at least one to-be-loaded picture from the to-be-loaded queue to the loading queue based on the mounting state indicating that the at least one target page element is mounted and the motion state label being the non-scrolling state, and adding the at least one to-be-loaded picture to the to-be-loaded queue based on the mounting state indicating that the at least one target page element is mounted and the motion state label being the scrolling state.

9. The non-transitory computer-readable storage medium of claim 8, wherein the method further comprises:

not adding the at least one to-be-loaded picture to the to-be-loaded queue or moving the at least one to-be-loaded picture from the to-be-loaded queue to the loading queue based on the mounting state indicating that the at least one target page element is not mounted.

10. The non-transitory computer-readable storage medium of claim 7, wherein the method further comprises:
   obtaining a position state of the at least one target page element,
   moving the at least one to-be-loaded picture from the to-be-loaded queue to the loading queue in response to determining that the at least one target page element is within the display space of the electronic device based on the position state and the motion state label being the non-scrolling state; and
   adding the at least one to-be-loaded picture to the to-be-loaded queue in response to determining that the at least one target page element is within the display space of the electronic device based on the position state and the motion state label being the scrolling state.

11. The non-transitory computer-readable storage medium of claim 10, wherein the method further comprises:
   not adding the at least one to-be-loaded picture to the to-be-loaded queue or moving the at least one to-be-loaded picture from the to-be-loaded queue to the loading queue in response to determining that at least one the target page element is outside the display space of the electronic device based on the position state.

12. An electronic device, comprising:
   a processor; and
   a memory configured to store instructions executable by the processor;
   wherein, the processor is configured to configured to:
   obtain at least one target page element;
   obtain a motion state of the at least one target page element as a scrolling state;
   obtain at least one to-be-loaded picture carried by the at least one target page element;
   in response to obtaining the motion state as the scrolling state, add the at least one to-be-loaded picture to a to-be-loaded queue and not downloading the at least one to-be-loaded picture in the to-be-loaded queue;
   set a motion state label of the at least one to-be-loaded picture as a scrolling state in response to obtaining the motion state of the at least one target page element as the scrolling state;
   monitor the at least one to-be-loaded picture in the to-be-loaded queue by monitoring the motion state of the at least one target page element carrying the at least one to-be-loaded picture;
   obtain that the motion state label of the at least one target page element carrying the at least one to-be-loaded picture in the to-be-loaded queue changes from the scrolling state to a non-scrolling state;
   set the motion state label of the at least one to-be-loaded picture as a non-scrolling state in response to obtaining that the motion state of the at least one target page element changes from the scrolling state to the non-scrolling stat;
   moving the at least one to-be-loaded picture from the to-be-loaded queue to a loading queue to be downloaded in response to setting the motion state label of the at least one to-be-loaded picture as the non-scrolling state;
   download, one by one, the at least one to-be-loaded picture in the loading queue; and
   display at least one of the at least one downloaded to-be-loaded picture in a display space of an electronic device.

13. The electronic device of claim 12, wherein the processor is further configured to:
   obtain a mounting state of the at least one target page element, wherein the mounting state is configured to indicate whether the at least one target page element is mounted or not;
   move the at least one to-be-loaded picture from the to-be-loaded queue to the loading queue based on the mounting state label indicating that the at least one target page element is mounted and the motion state being the non-scrolling state, and
   add the at least one to-be-loaded picture to the to-be-loaded queue based on the mounting state indicating that the at least one target page element is mounted and the motion state label being the scrolling state.

14. The electronic device of claim 13, wherein the processor is further configured to:
   not add the at least one to-be-loaded picture to the to-be-loaded queue or move the at least one to-be-loaded picture from the to-be-loaded queue to the loading queue based on the mounting state indicating that the at least one target page element is not mounted.

15. The electronic device of claim 12, wherein the processor is further configured to:
   obtain a position state of the at least one target page element,
   move the at least one to-be-loaded picture from the to-be-loaded queue to the loading queue in response to determining that the at least one target page element is within the display space of the electronic device based on the position state and the motion state label being the non-scrolling state; and
   add the at least one to-be-loaded picture to the to-be-loaded queue in response to determining that the at least one target page element is within the display space of the electronic device based on the position state and the motion state label being the scrolling state.

16. The electronic device of claim 15, wherein the processor is further configured to:
   not add the at least one to-be-loaded picture to the to-be-loaded queue or move the at least one to-be-loaded picture from the to-be-loaded queue to the loading queue in response to determining that the at least one target page element is outside the display space of the electronic device based on the position state.

17. The electronic device of claim 12, wherein the processor is further configured to:
   remove the at least one to-be-loaded picture from the to-be-loaded queue in response to the at least one target page element being not mounted.

* * * * *